Feb. 7, 1956 L. ROSEN 2,733,535
PLUG TYPE FISHING LURE
Filed Nov. 17, 1952 2 Sheets-Sheet 1

INVENTOR.
LOUIS ROSEN
BY Gustave Miller
ATTORNEY

Feb. 7, 1956 L. ROSEN 2,733,535
PLUG TYPE FISHING LURE
Filed Nov. 17, 1952 2 Sheets-Sheet 2
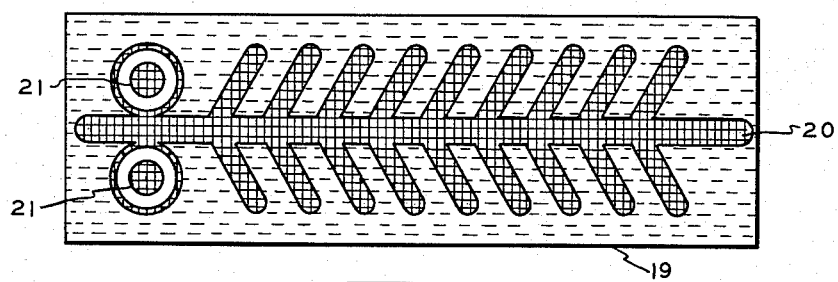
Fig. 5
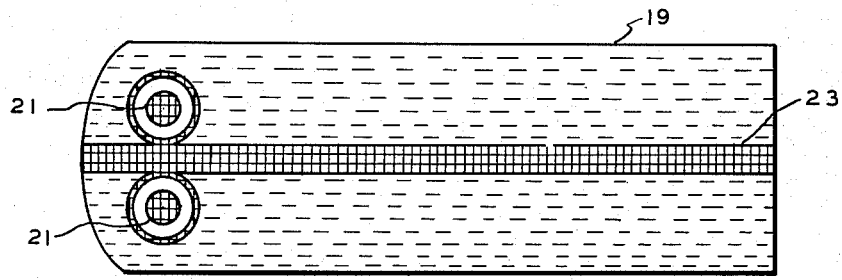
Fig. 6
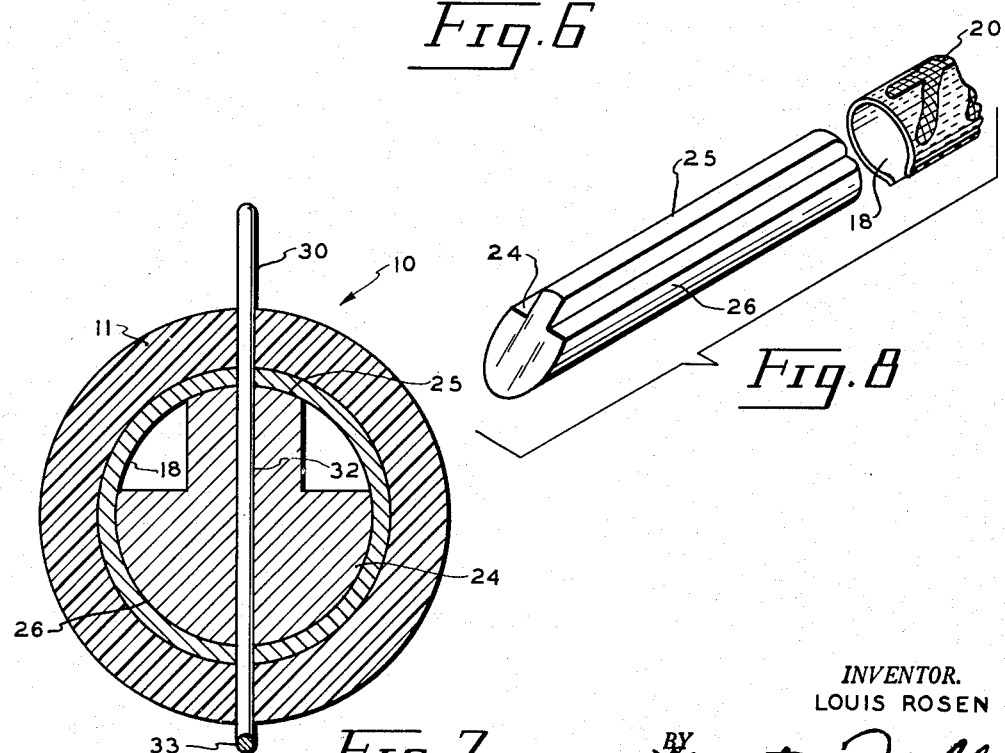
Fig. 8
Fig. 7
INVENTOR.
LOUIS ROSEN
BY Gustave Miller
ATTORNEY

United States Patent Office 2,733,535
Patented Feb. 7, 1956

2,733,535

PLUG TYPE FISHING LURE

Louis Rosen, Daytona Beach, Fla.

Application November 17, 1952, Serial No. 320,868

1 Claim. (Cl. 43—42.33)

This invention relates to a plug type fishing lure assembly and has for an object to provide an improved fishing lure of the plug type.

A further object of this invention is to provide a fishing lure of the plug type made of transparent plastic material and provided with integrally formed eye pupils at one end thereof, cooperating with reflecting eye representations placed internally thereof, so that the eyes will look large and lifelike, thus, enhancing the effectiveness of the lure.

A further object of this invention is to provide a lure which is weighted at one end and buoyant at the other end, so that when attached to a fish line at the weighted end, it may be caused to have its head end bob up and down as it is played in the water, thus, enhancing its resemblance to a minnow and increasing its effectiveness as bait.

A further object of this invention is to provide a fishing lure of the plug type made of a transparent plastic tube closed and weighted at one end and open at the other, so that opaque reflecting material may be inserted therein and be visible therethrough, and having its open end sealed against air and water, so that the plug will be weighted at the head end and buoyant at the tail end.

A further object of this invention is to provide a fish lure of the plug type which is hollow, buoyant at the tail end, weighted at the head end, and having a securing means holding the weight in its proper location, which securing means extends externally of the plug to provide additional reflecting surface and to also provide a securing means for a fishing line and a fish hook.

Still a further object of this invention is to provide a hollow fish lure of the plug type within which may be inserted any one of a number of different reflective patterns to be visible therethrough, and which will also additionally be provided with magnifying eye pupils integrally formed in the transparent plug and eye representations forming part of the patterns therewithin cooperating with the magnifying eye pupils.

With the foregoing and other objects in view, this invention comprises the combination, construction and arrangement of parts hereinafter set forth, claimed and disclosed in the accompanying drawings, wherein:

Fig. 5 is a plan view of a sheet of opaque reflecting material of one pattern for use within the fishing plug.

Fig. 6 is a similar view of another pattern.

Fig. 7 is a sectional view on line 7—7 of Fig. 2.

Fig. 8 is a perspective view of the weight and of a fragment reflecting material rolled in a tube ready for assembly.

Figure 1:
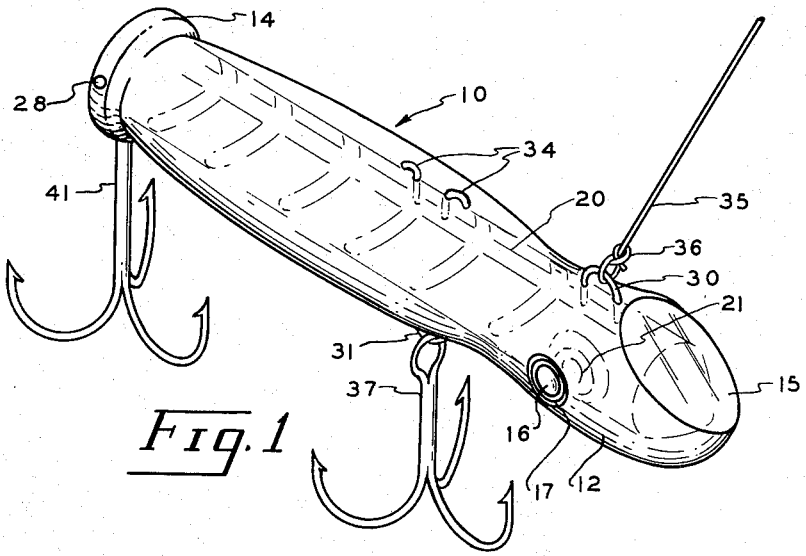
Fig. 1 is a perspective view of the plug type fishing lure of this invention.
Figure 2:
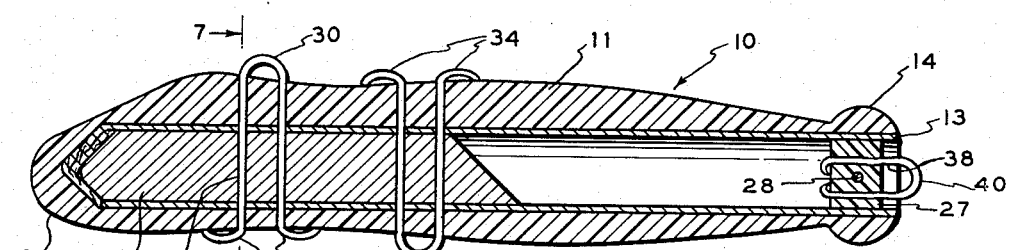
Fig. 2 is a longitudinal vertical section of the fishing plug.

There is shown at 10 the assembled plug type fishing lure of this invention. This fishing lure 10 includes a transparent tube or outer sheath 11 preferably of plastic material, which is integrally closed at the head end 12 thereof, and is initially opened at the tail end 13 thereof, being provided with a bead 14 about the open tail end 13. This tube 11 is externally shaped to somewhat resemble a minnow being provided with a slanted forehead 15 and a pair of oppositely disposed integrally formed eye pupils 16.

Figures 3, 4:
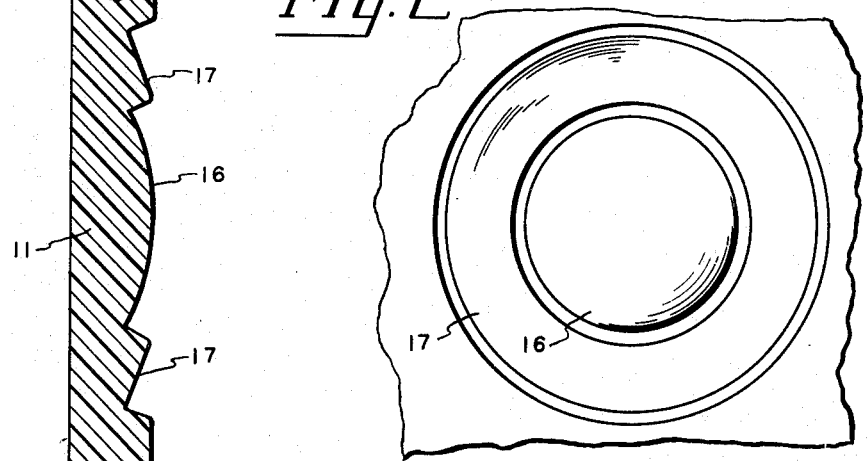
Fig. 3 is an enlarged fragmentary view of the integrally formed magnifying eye pupil.
Fig. 4 is a sectional view on line 4—4 of Fig. 3.

As will be seen from Figs. 3 and 4, the eye pupils 16 are so curved and shaped as to provide at least one additional magnifying surface 17 separated from the magnifying eye pupils 16 and from the external surface of the plug 11 as shown in Figs. 3 and 4.

Internally, the tube or plug 11 is internally cylindrical and a cylindrical tube or inner sheath 18 of paper or other similar sheet material, is externally provided with any suitable reflecting pattern 20, and more particularly adjacent one end thereof with a pair of eye representations 21, so that when the sheet 19 is formed into the cylinder 18 and inserted through the open end 13 of the fishing lure tube 11, the eye representations 21 will be aligned with the magnifying eye pupils 16, so as to present an extremely lifelike appearance to a fish when in the water.

As shown in Fig. 6, a different pattern as at 23 may be used instead of the pattern 20, and obviously, any other different pattern may be used so long as the pattern is preferably of reflecting material and the eyes are so located thereon that they will align with the eye pupils.

Also inserted within the head end 12 of the fishing lure tube 11 and extending about half the length thereof is a weight 24 having its top edge and its bottom and sides curvilinear of the same radius as the inside of the opaque tube 18, but otherwise formed of inverted T shape in cross section so as to have a T stem 25 extending upwardly from its bottom portion 26. As a result, with the weight 24 in position within the sheet material tube 18 and fishing lure tube 11, the fishing lure will tend to be more buoyant at the top than at the bottom, and hence, tend to float upright. The rear half portion of the fishing lure tube 11 is left empty, but is sealed in air and watertight relation by cement or other suitable means with a closure member 27 preferably of similar transparent or plastic material and securely anchored in position by means of a transverse cross pin 28 extending through the beaded end 14 and the plug 27.

In order to secure the weight 24 positively in position, a pair of staples 30 and 31 are inserted vertically through the forward or head end of the fishing lure tube 11, through the sheet material tube therein and through the T stem portion 25 and bottom 26 of the weight 24. Both staples are made of similar material having a highly reflective surface, and the staple 30 is inserted downwardly through the forward end thereof, so that its legs 32 extend through the weight 24 and its prongs 33 are turned outwardly and upwardly, the other staple 31 being inserted similarly except that it is inserted from the bottom and has its prongs 34 bent outwardly and downwardly on the top of the fishing lure plug 11. The bights as well as the prongs of the staples, being of bright reflective material, thus, provide additional reflective surfaces.

In addition, the bight of the staple 30 provides a securing means for the fishing line 35 to be tied thereto, as at 36, while the bight of the staple 31 provides a securing means for the eye 37 of a conventional three prong fishing hook.

A similar staple of similar reflecting metal 38 is inserted through the closure member 27 in the open tail end 13 and its bight 40 is placed so close to the end of the tail portion that the fish hook 41 thereon has its swivelling action limited to substantially a hemisphere rearwardly of the fishing plug, thus, preventing the two fish hooks from being able to swivel toward each other and tangle together when under the water, or when in use.

As a result of the construction thus described, a highly efficient fishing lure is provided. The weighted head end and buoyant tail end enable the fisherman to play the fishing lure 10 in the water and by means of the fishing line 35 to cause the head end to bob up and down while the tail end tends to remain in a more or less stationary motion, so that the head end tends to move up and down about the tail end as a radius, so that as the fishing lure 10 is played in the water, its action more closely resembles that of a live minnow. In addition, the reflective eye representations 21 behind the magnifying eye pupils 16 catch the light and reflect it in various directions in a lifelike manner.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A fishing lure, comprising a sheath having a weight within one end thereof and a plug in the opposite end thereof, said plug being spaced from the weight a distance substantially equal to the length of the weight, said sheath being of reflective material, a second sheath surrounding said first sheath and enclosing one end thereof, staples extending through the weight and sheaths, each staple having parallel legs and defining a loop at one end thereof of sufficient size to receive a fishing member therethrough for securement therewith and a correspondingly shaped staple extending through the plug providing a loop extending outwardly of the extremity of the last named sheath, said plug having its outer end recessed a distance from said extremity whereby a hook attached to the loop will have its eye so positioned in the recess as to limit its movement in a zone hemispherical in shape, said second sheath and said plug being of transparent material, said staples having highly reflective surfaces whereby scintillating effects will be produced as the lure is moved through a body of water.

References Cited in the file of this patent
UNITED STATES PATENTS

| | | |
|---|---|---|
| 779,083 | Jamison | Jan. 3, 1905 |
| 1,744,366 | Davenport | Jan. 21, 1930 |
| 1,915,208 | Walthers | June 20, 1933 |
| 1,960,488 | Gray | May 29, 1934 |
| 2,529,642 | Vaughn et al. | Nov. 14, 1950 |
| 2,566,995 | Rose | Sept. 4, 1951 |
| 2,573,592 | Nickel | Oct. 30, 1951 |
| 2,593,792 | Reckler | Apr. 22, 1952 |
| 2,599,035 | Wing | June 3, 1952 |
| 2,630,648 | Powell | Mar. 10, 1953 |
| 2,645,052 | Schiller | July 14, 1953 |
| 2,670,559 | Webb et al. | Mar. 2, 1954 |